United States Patent
Avins et al.

(10) Patent No.: US 7,658,679 B2
(45) Date of Patent: Feb. 9, 2010

(54) SERIES-PARALLEL MULTISTAGE TORQUE CONVERTER DAMPER

(75) Inventors: David Avins, Burbank, OH (US); Fraser Macdonald, Farmington Hills, MI (US); Matthew Frary, Burbank, OH (US)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 488 days.

(21) Appl. No.: 11/507,149

(22) Filed: Aug. 21, 2006

(65) Prior Publication Data

US 2007/0051577 A1 Mar. 8, 2007

Related U.S. Application Data

(60) Provisional application No. 60/715,034, filed on Sep. 8, 2005.

(51) Int. Cl.
*F16F 15/121* (2006.01)
(52) U.S. Cl. .................... 464/68.1; 192/213.1
(58) Field of Classification Search ............. 464/67.1, 464/68.1; 192/213–213.31
See application file for complete search history.

(56) References Cited

U.S. PATENT DOCUMENTS

| | | | | |
|---|---|---|---|---|
| 4,138,003 A | | 2/1979 | Malloy | 192/3.29 |
| 4,422,535 A | * | 12/1983 | Ling | 192/213.1 X |
| 4,530,673 A | | 7/1985 | Lamarche | 464/64 |

(Continued)

FOREIGN PATENT DOCUMENTS

JP 10169715 6/1998

(Continued)

*Primary Examiner*—Greg Binda
(74) *Attorney, Agent, or Firm*—Simpson & Simpson, PLLC

(57) ABSTRACT

A method and apparatus for damping torque output from a torque converter turbine to input to a transmission. The damper includes: (a) an input device for connection to an engine; (b) a first spring set having drive springs; (c) a second spring set having secondary springs; (d) a third spring set having parallel springs; (e) a floating apparatus; and (f) an output device. Springs of the first spring set are compressible in a forward direction toward the output device as a result of torque applied to the input device and compressible in a reverse direction toward the input device as a result of torque applied by the output device. The first and second spring sets are in series between the input device and output device during a first forward compression of the first spring set, and the series is in parallel with the third spring set between the input apparatus and output device during a second compression of the first spring set. The first spring set is in parallel with the third spring set between the input apparatus and output device without the second spring set during a third compression of the first spring set. The floating apparatus is between the input apparatus and the output device and between springs of said first and second spring sets during the first forward compression of the first spring set. The method includes the steps of: (a) operating a spring set one and a spring set two in series between torque input and torque output; (b) placing a spring set three in parallel with spring sets one and two allowing more torque per degree of wind-up than in step (a); and (c) removing spring set two from series with spring set one resulting more torque per degree of wind-up than in step (b).

11 Claims, 15 Drawing Sheets

U.S. PATENT DOCUMENTS

| | | | |
|---|---|---|---|
| 4,637,500 A | 1/1987 | Gobel | 192/3.28 |
| 4,716,998 A * | 1/1988 | Tsukamoto et al. | 192/213.1 X |
| 4,722,715 A | 2/1988 | Billet et al. | 464/67 |
| 4,809,830 A | 3/1989 | Schierling | 192/3.29 |
| 4,891,033 A | 1/1990 | Heyser | 464/68 |
| 4,986,398 A | 1/1991 | Olsen | 192/3.28 |
| 6,029,793 A | 2/2000 | Tanaka et al. | 192/213 |
| 6,209,701 B1 | 4/2001 | Hashimoto et al. | |
| 6,729,453 B2 | 5/2004 | Uehara | 192/3.3 |
| 7,108,112 B2 | 9/2006 | Mizukami | 192/3.29 |
| 7,172,509 B2 | 2/2007 | Yamamoto et al. | 464/68.8 |
| 2004/0185940 A1 | 9/2004 | Yamamoto et al. | 464/68 |
| 2004/0216979 A1 | 11/2004 | Yamashita et al. | 192/212 |
| 2005/0028638 A1 | 2/2005 | Fenioux et al. | 74/574 |

FOREIGN PATENT DOCUMENTS

| | | |
|---|---|---|
| JP | 2005069353 | 3/2005 |
| JP | 2005069354 | 3/2005 |
| KR | 2002057745 A | 7/2002 |
| WO | WO 93/13338 | 7/1993 |

* cited by examiner

SERIES-PARALLEL MULTISTAGE TORQUE CONVERTER DAMPER

This application claims the benefit of U.S. Provisional patent application Ser. No. 60/715,034, filed on Sep. 8, 2005, which is expressly incorporated by reference herein.

BACKGROUND OF THE INVENTION

This invention relates to dampers for torque converters and especially relates to such torque converters where coils springs are inserted in the torque transfer path between the turbine of the torque converter and an output shaft to a transmission to dampen sudden energy or torque changes between the turbine and the output shaft.

The utilization of "variable displacement" engines operating in four or eight cylinder mode has made engine vibration isolation more difficult and there is thus a need for a damper having increased control and damper capacity (torque absorbing capacity for storage as potential energy that can be released to smooth torque transfer) due to a torque increase in the engine. A lower rate, i.e., torque capacity per degree of wind up, is also desirable to improve noise vibration harshness (NVH), i.e., noise and vibration perceived by a driver or passenger in a vehicle. Current turbine dampers will not meet the torque capacity or NVH requirements needed for transfer of torque in four or eight cylinder modes of newer variable displacement engines to a transmission and vice-versa.

Single stage and even dual stage turbine dampers are already commercially available to reduce torque converter vibration isolation from the drive of an engine but still have serious problems with needed capacity and rate. Further such known turbine dampers may require a large envelope space, i.e., space taken by the damper in the power train and may have a large hysteresis, i.e., energy loss primarily through friction during damper operation.

It has been known that a series of complete dampers could accomplish the task of capacity and lower rate but not without serious disadvantages, in particular with respect to complexity in cooperative operation, expense, envelope space, hysteresis and balance.

An example of a known turbine damper may for example be found in U.S. Patent Publication US2004/0185940. This damper operates by first compressing sets of springs 58A and 58B in series at an initial low rigidity, followed by springs 59 in parallel with 58A and 58B for an intermediate rigidity, followed by springs 60 in parallel with 58A, 58B and 59 for highest rigidity before lock up. This damper has a significant disadvantage, apparently not recognized by the inventors, in that the series of springs 58A and 58B are weak relative to 59 and 60. By the time springs 59 and 60 are able to enter in parallel, springs 58A and 58B will bottom out or nearly bottom out unless the weak springs only permit a small amount of initial wind up. Bottoming out causes outwardly bowing damaging forces on the springs. In understanding this it should be recognized that all springs are concentrically aligned.

A similar device is shown in U.S. Patent Publication US2004/0216979 except that the first sets of springs 11 in the form of dual spring sets where an internal spring is disposed within an outer spring so that only the outer spring initially operates, and the internal spring operates in parallel with the outer spring upon sufficient outer spring compression. Such an arrangement has definite disadvantages in that the inside spring must necessarily be of a smaller diameter than the outside spring and is thus usually significantly weaker. Such unmatched weakness can be partially offset by using thicker wire in the inside spring than used in the outside spring. This of course limits the usable strength of the outside spring by parameters unrelated to space and length. Further, the weaker spring can never be removed from torque transfer. Additionally, when it is desirable to match characteristics of the inside and outside springs, e.g., so the converter has similar characteristics in both rotational directions, such matching is difficult and in fact cannot be realistically completely accomplished due to the drastically different spring diameters. Another disadvantage is that multiple inventories of different spring types have to be maintained and properly used.

A second set of springs 15 is provided that operates in parallel with sets 11 when torque is sufficiently high.

U.S. Pat. No. 4,138,003 describes a damper having multiple series of springs, again where most springs are in nested sets with all of the disadvantages described above.

BRIEF DESCRIPTION OF THE INVENTION

In accordance with the invention, there is therefore provided a reliable high capacity torque converter damper having a large wind up angle where, a lower rate (less torque required per degree of wind up) is initially required with rate progressively increasing as wind up continues.

More particularly, the invention is a damper for a torque converter. The torque converter itself has a pump rotationally drivable by an engine and a hydraulic turbine rotationally drivable by the pump. The turbine in turn may be interconnected to an input shaft of a transmission through a damper of the invention. The turbine is rotatable about a shaft, and usually is provided with a central hub for that purpose.

The damper operates to transfer torque from the turbine of the torque converter to an output hub, e.g., for connection to an input shaft of a transmission.

When torque input by the turbine is greater than the torque that can be immediately smoothly transferred to the transmission in the form of rotational energy, e.g., due to inertia of the transmission and connected apparatus, e.g., the wheel drive train and inertia of the driven vehicle, the damper is able to absorb and hold a significant amount of the excess torque and store it as potential energy for later release when it can be smoothly passed to the transmission in the form of rotational energy. It is to be understood that the damper can also operate in reverse, i.e., storing excess torque energy from the transmission when the engine energy output is less than energy input from inertia of motion of the vehicle and drive train and absorbing excess torque for passage back toward the engine.

The damper of the invention requires an input device for receiving torque energy from an input apparatus such as an engine and an output device for passing torque energy to an output apparatus such as a transmission. The input device is connected to first ends of springs of spring set 1 (set 1 first ends). Second ends of springs of spring set 1 (set 1 second ends) are in contact with first contact surfaces of a floating apparatus. A second contact surface of the floating apparatus is in contact with first ends of springs of spring set 2 (set 2 first ends) and second ends of spring set 2 (set 2 second ends) are in contact with the output device.

The floating apparatus is free to move in a first rotational direction with applied spring pressure to a first position between 0 and 99 percent compression of spring set 1 and is locked to one of the input device and output device by a locking device at a second position between 40 and 90 percent compression of spring set 1. The floating apparatus is also free to move in a second rotational direction opposite the first rotational direction with applied spring pressure to a first position between 0 and 99 percent compression of spring set 1 and may be locked to one of the input device and output device by a locking device at a second position between 40 and 99 percent compression of spring set 1. The output device is a device such as an output disk or hub. The third set of springs are located between the input device and intermediate flange (or optionally between the input device and output device) such that first ends of springs of the third set of springs engage the input device and transfer torque, at second ends of the springs of the third set, to the output device (usually through the intermediate flange) at a position between 5 and 30 percent compression of spring set 1.

At a first stage of operation, in a normal drive direction, spring sets 1 and 2 operate in series and allow a large wind up relative to torque input (low "rate"). At a second stage spring set 3 is introduced in parallel with spring sets 1 and 2 thus allowing less wind-up relative to torque input than in stage one, absorbing more torque per degree of wind-up (intermediate "rate"). At a third stage, spring set 2 is removed from series with spring set 1 thus requiring even more torque per degree of wind-up (high "rate"). As previously discussed, the damper may operate in reverse, i.e., as a damper for torque from the transmission to the engine when torque input to the damper from the transmission exceeds torque input to the damper from the engine. Spring set 2 may contain springs of about the same strength as spring set 1 or may contain stronger or weaker springs. Weaker springs than spring set 1 might be advantageous so that the initial rate is lower in the normal (drive or forward) operation direction from the engine to the transmission. In the forward direction, at least one stop between floating apparatus and one of the input device and output device removes springs 2 from series with spring set 1 preventing springs of spring set 2 from bottoming out. Similarly, at least one stop prevents the springs of spring set 2 from bottoming out in the reverse direction.

In a preferred embodiment, the damper itself includes a cover plate radially oriented about and connected with and driven by the turbine, e.g., through a turbine hub that is concentric with but rotationally free of the output hub. An intermediate flange is provided that is also radially oriented with respect to the output hub. An output flange is provided that is connected to the output hub.

Several sets of springs are provided that provide elasticity for permitting damper wind up, i.e., twisting with storage of twisting energy or torque. The springs include a set of drive springs, a set of secondary springs, that may or may not be weaker than the drive springs, and a set of parallel springs that are usually have about the same compression characteristics and about the same strength of the drive springs, but optionally may be of different strength and compression characteristics.

All of the springs are radially oriented with respect to the output hub and retained by the cover plate, such that upon initial movement of the turbine and attached cover plate, a first end of each of the drive springs is in contact with the cover plate and a second end of each of the drive springs is in contact with the intermediate flange and a first end of each of the secondary springs is in contact with the intermediate flange and a second end of each of the secondary springs is in contact with the output flange such that the drive springs compress and transfer force to and cause the intermediate flange to rotate and to thus compress the secondary springs. The secondary springs in turn cause the output flange and output hub to rotate. The drive and secondary springs initially absorb energy from the turbine and allow it to rotate through a greater angle than the output flange thus compensating for time delay in overcoming initial inertia of the output hub and attached apparatus.

Parallel springs are held in spaces within the intermediate flange (or within such spaces in the cover plate) longer than the length of the parallel springs such that upon initial rotation of the turbine, the parallel springs do not transfer torque from the cover plate to the intermediate flange but upon sufficient compression of the drive and secondary springs, the cover plate moves sufficiently far (winds up sufficiently far) relative to the intermediate flange that the parallel springs contact both the cover plate and the intermediate flange so the parallel springs transfer torque from the cover plate to the intermediate flange and subsequently to the output flange in parallel with the drive springs further increasing torque capacity transfer to the output flange as torque increases.

The intermediate flange and output flange are provided with stop faces such that the intermediate flange and drive flange contact each other to directly transfer rotational energy from the intermediate flange to the drive flange, before the secondary springs, located between the intermediate flange and output flange, bottom out thus permitting the drive springs and parallel to transfer higher torque through the intermediate flange to the output flange than capable by the secondary springs.

DETAILED DESCRIPTION OF THE INVENTION

In discussing the present invention the following definitions are used:

"Wind-up angle" is the relative angle between the cover plate of the damper and the output flange starting at zero degrees from a "free" position.

"Free position" is the position where all springs have minimum applied compressive force.

"Damper capacity" is the torque absorbing ability, commonly measured in Newton-meters, which absorbed torque is held as potential energy until released.

"Rate" of wind-up is the amount of absorbed torque per wind-up degree.

"Hysteresis" is energy loss, mostly due to friction, during wind-up and return to a free position.

"Envelope space" is the space required in the system to hold the damper.

"Damper Input" is intended to mean energy input into the damper, either in a direction from the turbine/engine or in a direction from the transmission. For convenience in description, the input is described as coming from the turbine toward the transmission but it is understood that the damper can operate in reverse, from the transmission to the turbine. Similarly "Damper Output" is intended to mean energy output from the damper, either in a direction toward a transmission or toward a turbine/engine, but for convenience is usually described in a direction toward a transmission.

"Percent compression" means the percentage of linear compression of a coil spring from zero or the length of the unstressed spring to "bottoming out" where the spring is compressed to the point where wire coils, within the spring, contact each other.

The invention is for a high capacity torque converter damper having a large wind up angle where, a lower rate is initially required with rate progressively increasing as wind up continues. The design includes three sets of springs acting in series and parallel at different stages of wind-up. A turbine damper may be included that eliminates turbine mode for 6 or 8 cylinder engines. The multistage rate improves drive train mode for 3 or 4 cylinder mode of cylinder shut-off engines More particularly, the invention is a damper for a torque converter. The torque converter itself has a pump rotationally drivable by an engine and a turbine rotationally hydraulically drivable by the pump. The turbine in turn may be interconnected to an input shaft of a transmission through a damper of the invention. The turbine is rotatable about a shaft, and usually is provided with a central hub for that purpose.

The damper normally operates to transfer torque from the turbine of the torque converter to an output hub, e.g., for connection to an input shaft of a transmission; although it may operate in reverse.

Figure 10:
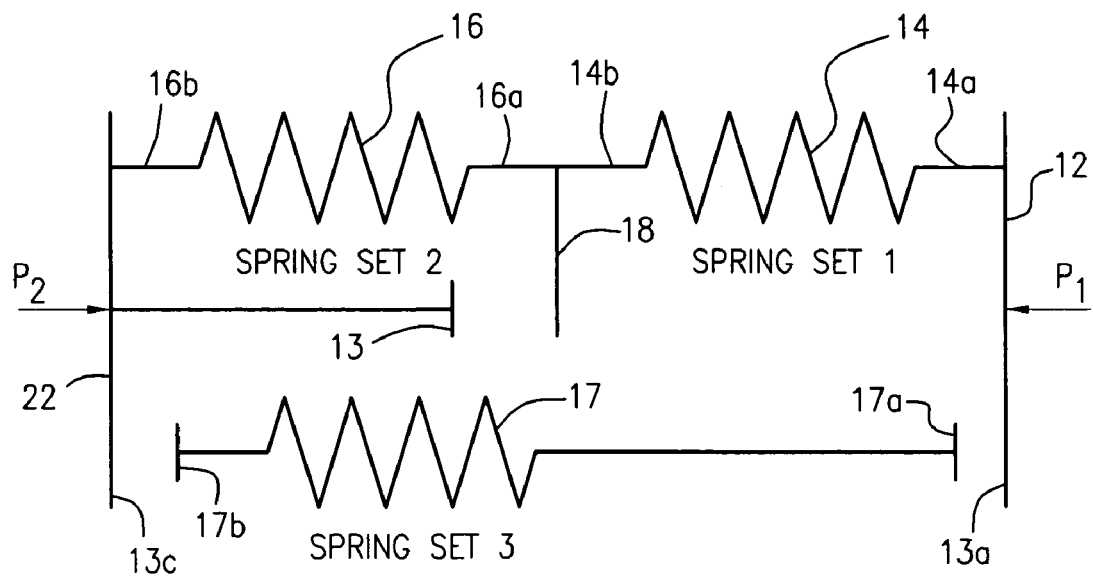
FIG. 10 shows a diagram of operation of spring sets within the damper of the invention where spring set 3 operates between an input device and an output device.
Figure 10A:
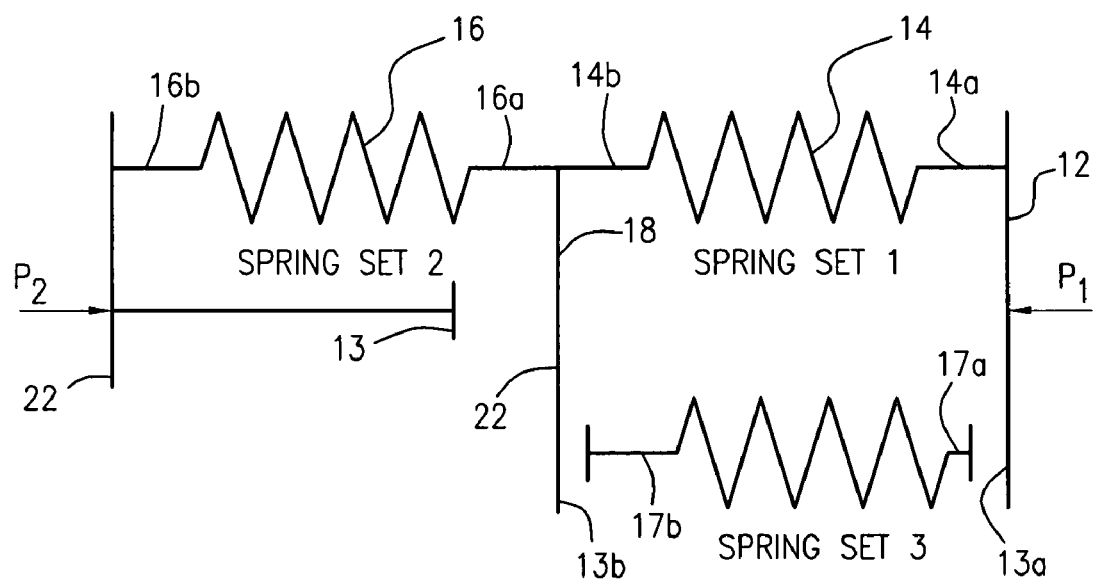
FIG. 10a shows a diagram of operation of spring sets within the damper of the invention where spring set 3 operates between an input device and floating apparatus.
Figure 10B:
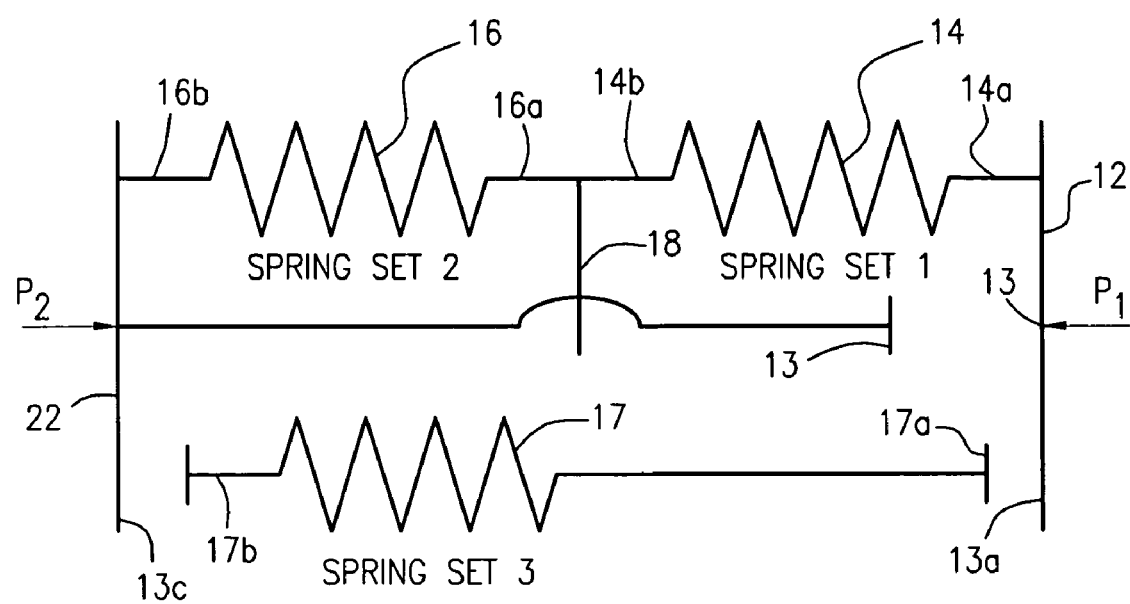
FIG. 10b shows a diagram of operation of spring sets within the damper of the invention where protective stops of spring set 2 operate between an input device and an output device.

As can be understood from FIGS. 10, 10a and 10b, a damper of a preferred embodiment of the invention requires an input device 12 moved by force $P_1$ (or 22 in opposite operation moved by force $P_2$), e.g., a turbine, plate connected to a turbine (cover plate), or a plate or shaft connected to the engine. The input device 12 is connected to first ends 14a of drive springs 14 of a first spring set 1 (set 1 first ends). Second ends 14b of springs 14 of spring set 1 (set 1 second ends) are in contact with floating apparatus 18, e.g., a freely rotatable disk (intermediate flange), freely movable levers or freely movable cams. The floating apparatus 18 is in contact with first ends 16a of secondary springs 16 of spring set 2 (set 2 first ends). The floating apparatus 18 is free to move with applied spring pressure $P_1$ in a first position between 0 and 90 percent compression of springs 14 of spring set 1 and floating apparatus 18 is locked to an output device 22 by a locking device 13 at a second position between 40 and 90 percent compression of springs 14 of spring set 1. The locking device 13 may, for example be, interacting output apparatus and floating apparatus contact surfaces, one or more locking pins between the output apparatus and floating apparatus, or shaft keys or splines locking the output apparatus and floating apparatus together, as well as other devices within the ability of one skilled in the art. Second ends 16b of springs 16 of spring set 2 are in contact with output drive device 22 such as an output disk or hub. In the embodiment shown in FIG. 10, the third set 3 of springs 17 may be located between the input device 12 and output device 22 such that first and second ends 17a and 17b of springs 17 of the third set of springs engage the input device 12 and output device 22 at surfaces 13a and 13c, respectively. In the embodiment shown in FIG. 10a, the third set 3 of springs 17 may be located between the input device 12 and floating apparatus 18 such that first and second ends 17a and 17b of springs 17 of the third set of springs engage the input device 12 and floating apparatus 18 at surfaces 13a and 13b, respectively, at a position between 5 and 30 percent compression of spring set one. FIG. 10b shows a diagram of operation of spring sets within the damper of the invention where protective stops 13 of spring set 2 operate between an input device 12 and an output device 22.

At a first stage of operation of the embodiments shown in FIGS. 10, 10a and 10b, using an input force $P_1$, spring sets 1 and 2 operate in series and allow a large wind up relative to torque input (low "rate"). At a second stage spring set 3 is introduced in parallel with spring sets 1 and 2 thus allowing less wind-up relative to torque input than in stage one, absorbing more torque per degree of wind-up (intermediate "rate"). At a third stage, as shown in FIGS. 10 and 10a, spring set 2 is removed from series with spring set 1 (bypassed) thus requiring even more torque per degree of wind-up (high "rate") and preventing springs 16 of spring set 2 from bottoming out. In the embodiment shown in FIG. 10b, both spring sets 1 and 2 are locked out. As previously discussed, the damper may operate in reverse, i.e., as a damper for torque from the transmission to the engine when torque input to the damper from the transmission exceeds torque input to the damper from the engine. One of spring sets 1 and 2 (usually spring set 2) may optionally be weaker than the other so that the initial rate is lower in the normal operation direction from the engine to the transmission.

Figure 1:
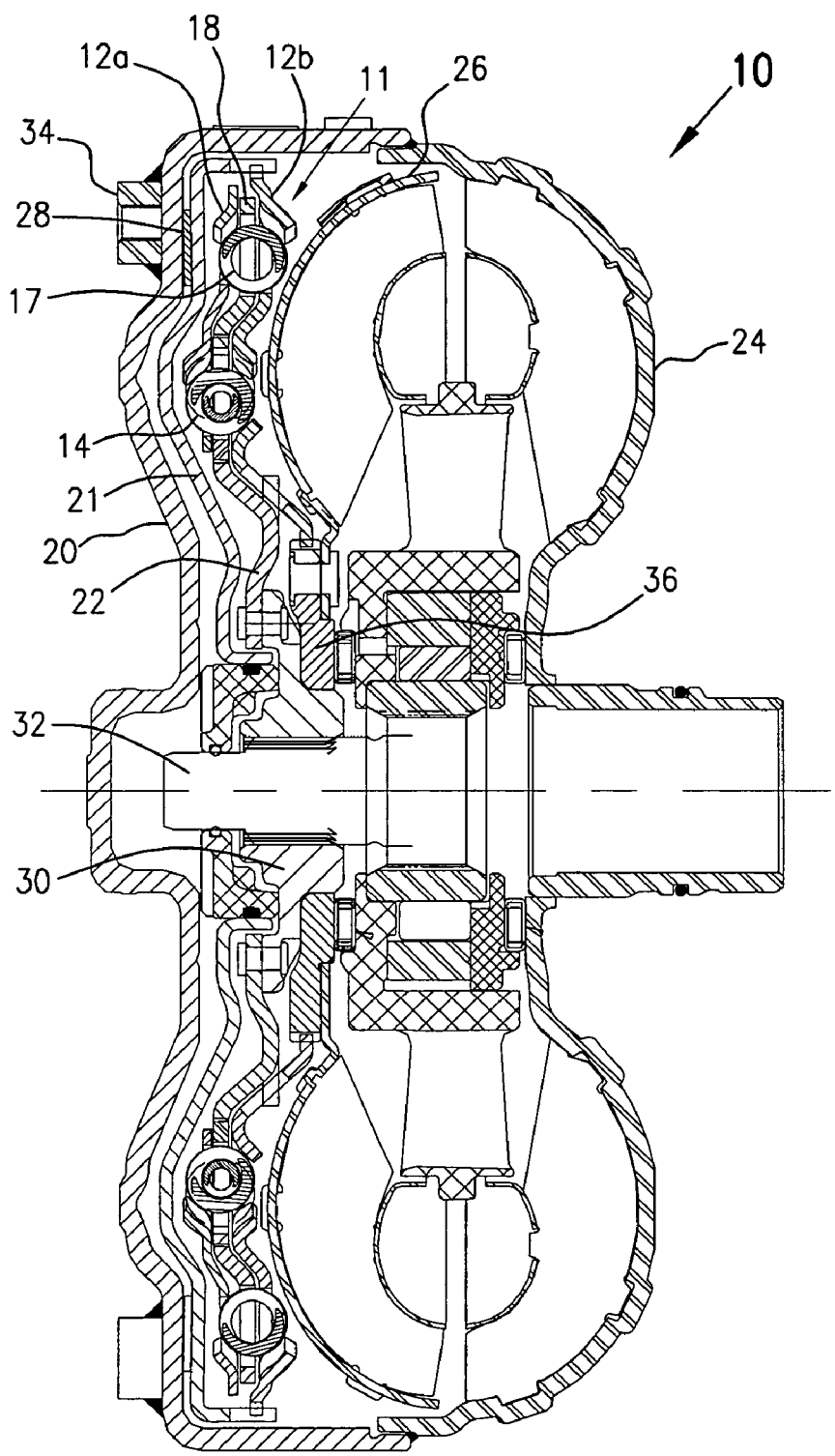
FIG. 1 is a cross sectional view of a torque converter including a preferred embodiment of a damper in accordance with the present invention.

In a preferred embodiment, as seen in FIG. 1 of the drawings, the torque converter 10 itself has a pump 24 rotationally drivable by an engine through cover 20 attached directly or indirectly to an engine at attachments 34. A turbine 26 is rotationally hydraulically drivable by the pump 24. The turbine 26 in turn may be interconnected to an input shaft 32 of a transmission through a damper 11 of the invention. The turbine 26 is rotatable about shaft 32, and usually is provided with a central turbine hub 36 for that purpose. When the relative speeds of the input shaft 32 of the transmission and the engine speed reach an appropriate ratio, piston plate 21, connected to damper 11, is hydraulically moved toward cover 20 and engages with cover 20 at clutch surface 28 thus causing the input shaft 32 to the transmission to rotate at the same speed as cover 20. The activation of hydraulics to move the piston plate is controlled by a controller, receiving signals from various sensors, e.g., relative speeds of the engine and input shaft to the transmission and variations in torque input and output from the torque converter.

The damper 11 normally operates to transfer torque from the turbine 26 of the torque converter 10 to an output hub 30, e.g., for connection to an input shaft 32 of a transmission; although, it may operate in reverse.

Figure 2:
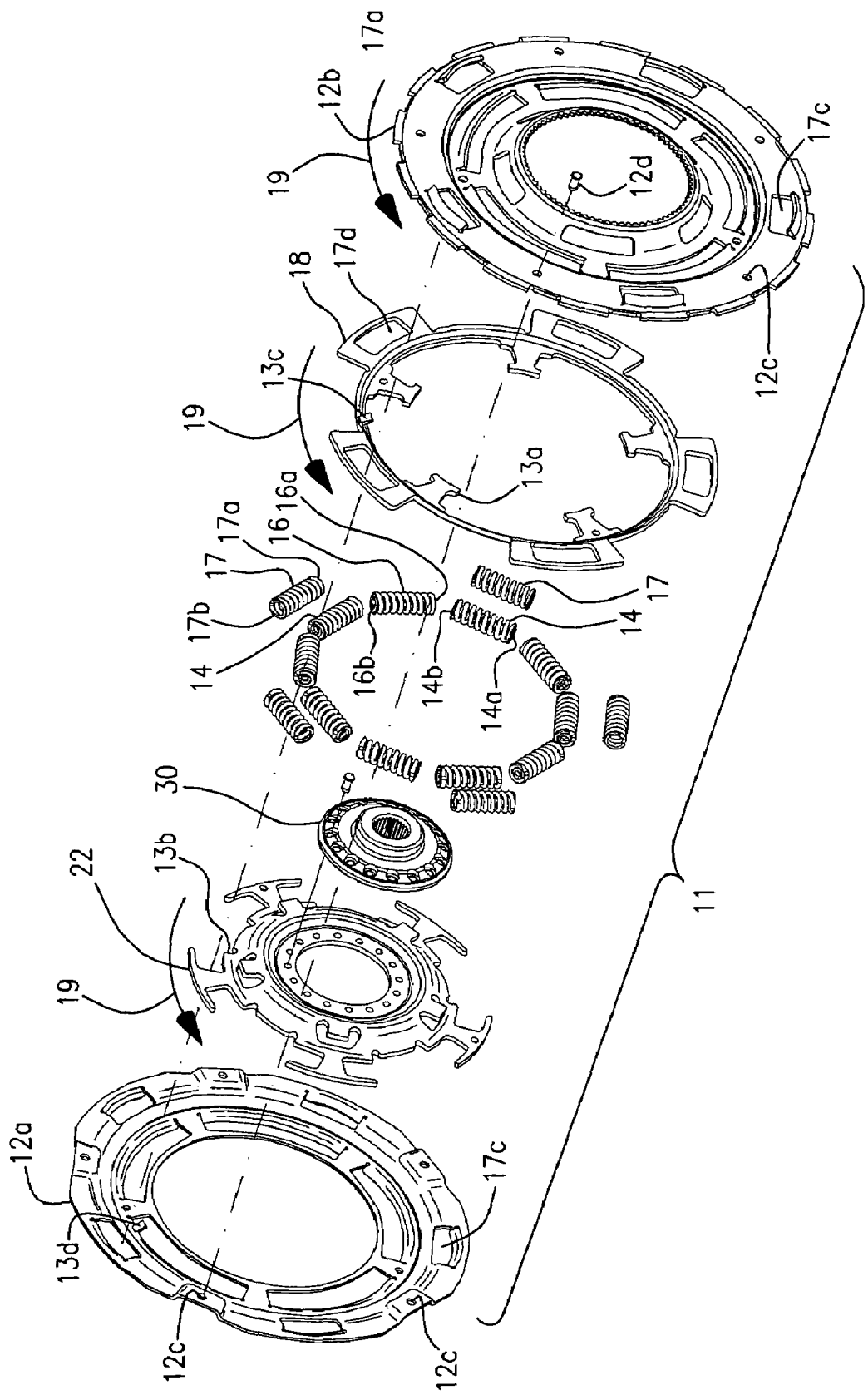
FIG. 2 is a perspective exploded assembly view of the damper portion of FIG. 1.
Figure 3:
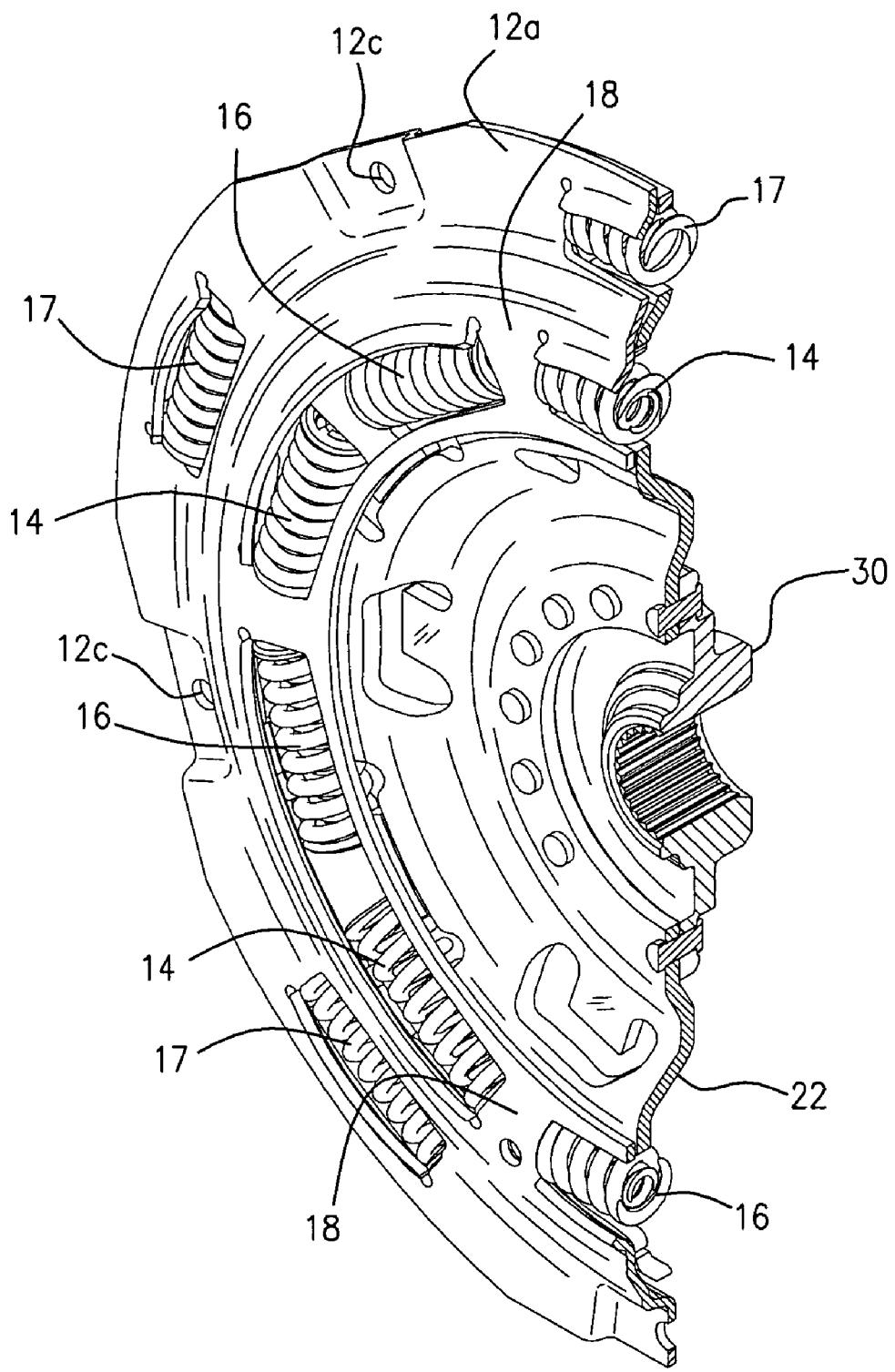
FIG. 3 is a perspective cut away view of the assembled damper of FIG. 2 from the output side of the damper.
Figure 4:
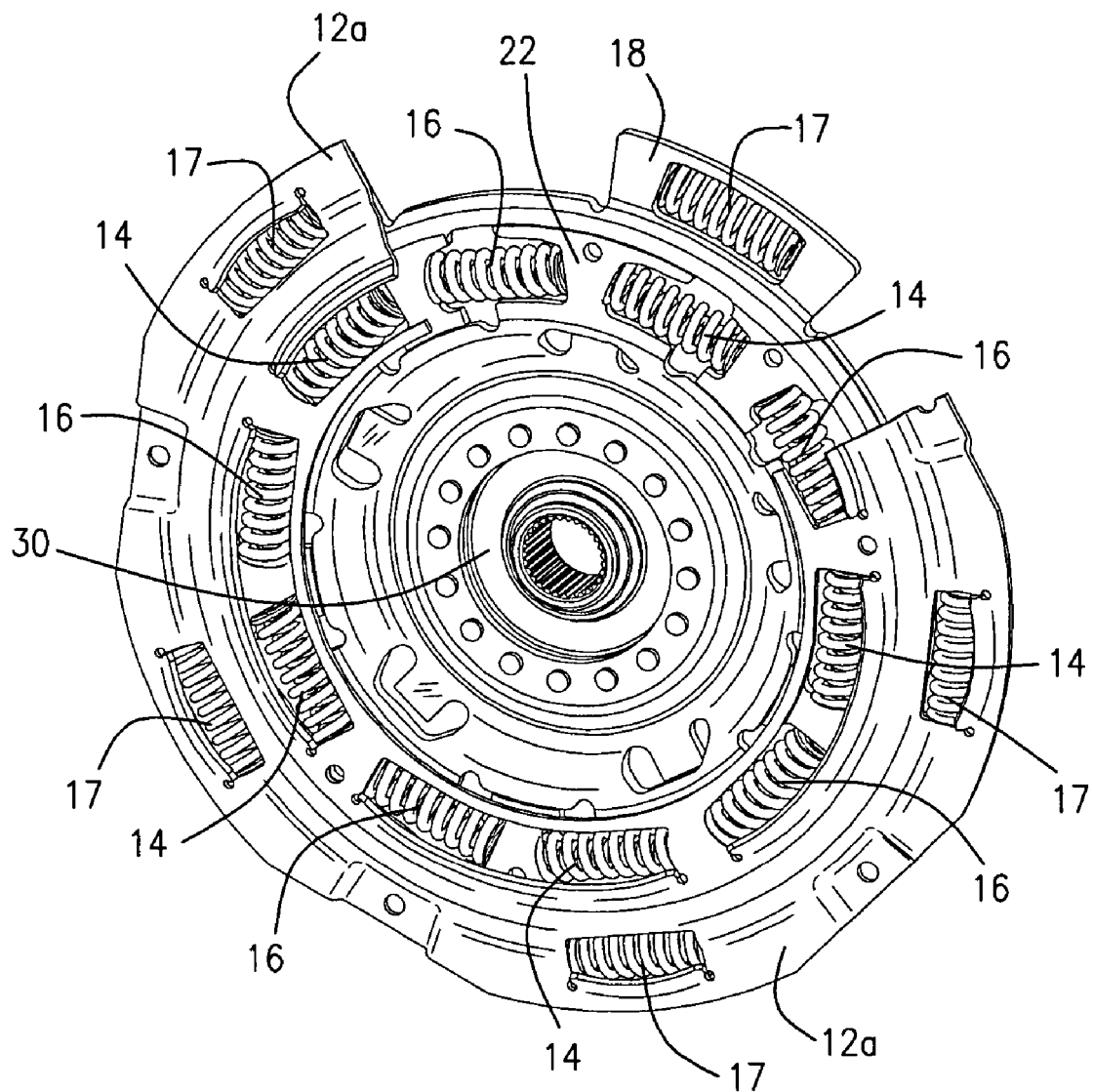
FIG. 4 is a view of the damper of FIG. 3 from the output side of the damper showing cut away portions at the periphery of the cover plate.

As best seen in FIGS. 2-9b, the damper 11 itself preferably includes a cover plate 12a/12b radially oriented about and connected with and driven by the turbine 26, e.g., through the turbine hub 36 that is concentric with but rotationally free of the output hub 30. The cover plate 12a/12b itself is made of cover plate halves 12a and 12b assembled about the other components of the damper 11 by means of bolts or rivets 12d through connecting holes 12c arranged about the circumference of the cover plate halves 12a and 12b, as best seen in FIG. 2. An intermediate flange 18 is provided that is also radially oriented with respect to the output hub 30. An output flange 22 is provided that is connected to the output hub 30.

Several sets 1, 2 and 3, of springs 14, 16, 17 are provided that provide elasticity for permitting damper wind up, i.e., twisting with storage of twisting energy or torque. The springs include a set 1 of drive springs 14, a set 2 of secondary springs 16, optionally, but not essentially, weaker than the drive springs 14, and a set 3 of parallel springs 17.

All of the springs 14, 16 and 17 are radially oriented with respect to the output hub 30 and retained by the cover plate 12a/12b, such that upon initial movement of the turbine 26 and attached cover plate 12a/12b, a first end 14a of each of the drive springs 14 is in contact with the cover plate 12a/12b and a second end 14b of each of the drive springs 14 is in contact with the intermediate flange 18 and a first end 16a of each of the secondary springs 16 is in contact with the intermediate flange 18 and a second end 16b of each of the secondary springs 16 is in contact with output flange 22 (as is also shown in FIGS. 10, 10a and 10b). In the arrangement of the preferred embodiment shown in FIGS. 2-9b, drive springs 14 compress and transfer force to and cause the intermediate flange 18 to rotate and to thus compress the secondary springs 16. The secondary springs 16 in turn cause the output flange 22 and attached output hub 30 to rotate.

The drive and secondary springs 14 and 16 absorb energy from the turbine 26 and allow it to rotate through a greater angle a than the angle through which the output flange 22 rotates, thus compensating for time delay in overcoming initial inertia of the output flange 22, output hub 30 and attached apparatus. The intermediate flange 18 and output flange 22 are provided with stop faces 13a and 13b such that in a forward direction 19 the output flange 22 and intermediate flange 18 contact each other to directly transfer rotational energy from the intermediate flange 18 to the output flange 18, thus eliminating springs 16 from series with spring set 14, thus causing an increase of required torque to move springs 14 in parallel with springs 17 to thus transfer higher torque to the output flange 22 than capable by the secondary springs 16 and drive springs 14 in a series combination in parallel with springs 17. In the reverse direction, stops may also be provided, e.g., a stop 13 as shown in FIG. 10b, that lock the intermediate or floating flange 18 to the output flange 22, restricting compression of both the drive springs 14 and the secondary springs 16, or alternatively, stops 13c and 13d as best seen in FIG. 2, (stops 13 in FIGS. 10 and 10a) may be provided that lock the intermediate flange to the cover plate in the reverse direction, bypassing just secondary springs 16.

The parallel springs 17 are held in spaces 17c within the cover plate 12a/12b and can initially slide within space 17d within the intermediate flange since space 17d is longer than the length of the secondary springs 17, such that upon initial rotation of the turbine 26, the parallel springs 17 do not transfer torque from the cover plate 12a/12b to the intermediate flange 18 and thus indirectly to the output flange but upon sufficient compression of drive springs 14 and secondary springs 16, the cover plate 12a/12b moves sufficiently far (winds up sufficiently far) relative to the intermediate flange 18 so that the parallel springs 17 slide enough within space 17d so that springs 17 contact both the cover plate 12a/12b and the intermediate flange 18, so the parallel springs 17 transfer torque indirectly from the cover plate 12a/12b through intermediate flange 18 to the output flange 22 in parallel with the drive springs 14 (and initially with secondary springs 16) further increasing torque capacity transfer to the output flange 22 as torque increases.

Figure 5:
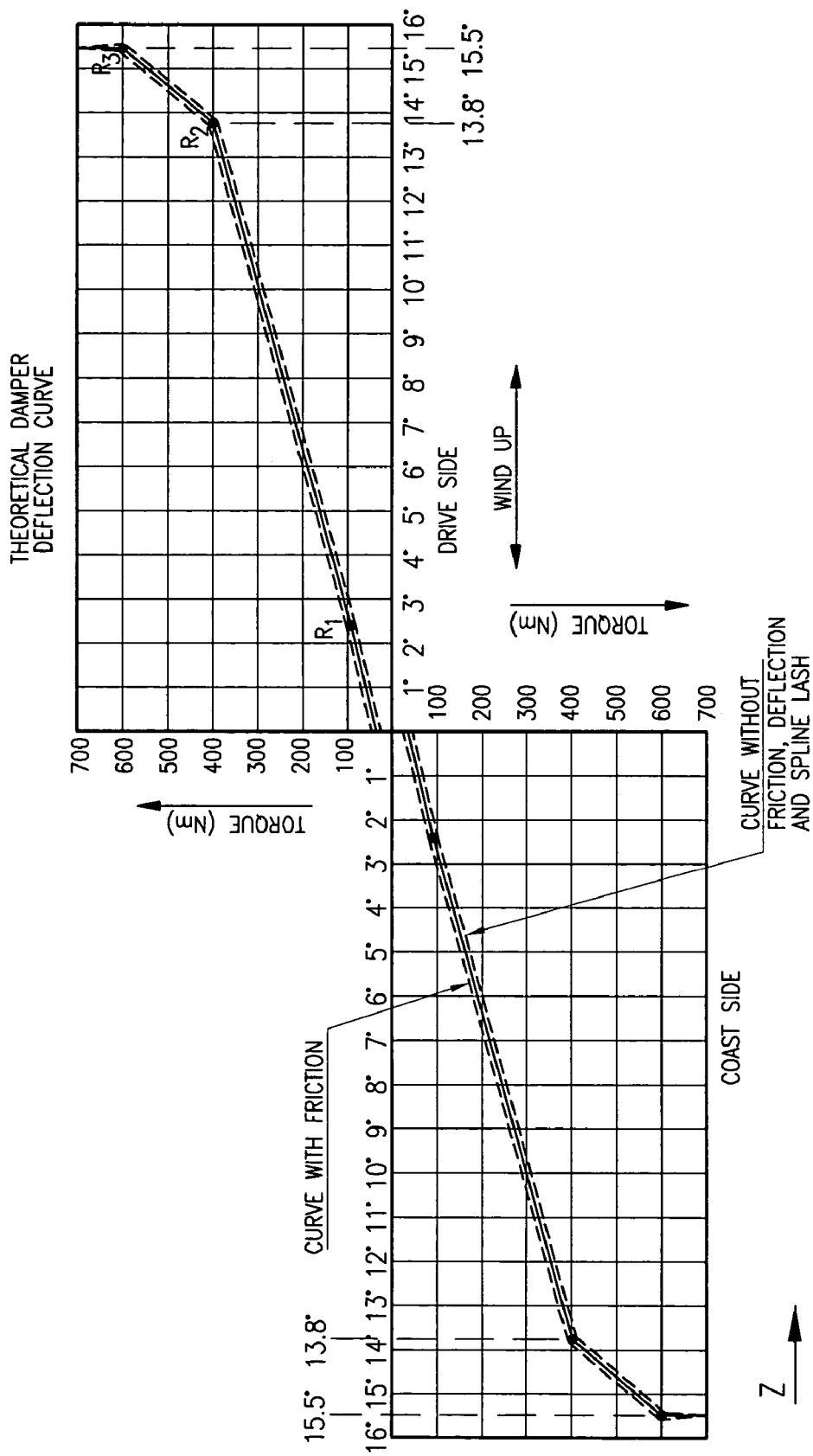
FIG. 5 is a torque v. wind-up angle graph showing rate and capacity characteristics of the damper as shown in FIG. 1.

The torque converter damper and method of the invention have significant advantages as clearly illustrated in FIG. 5 showing a "wind-up v. torque curve for a torque converter damper of the invention. As can be seen on the "drive side" of the curve, the initial rate of the damper is very low (soft) allowing a low, i.e., about 65 Newton-meters for about the first 2.5 degrees of wind-up, or about 26 Newton-meters per degree of wind-up. Such a curve greatly dampens shock from torque applied through the damper whenever torque variances between input and output occur. Up to $R_1$ the first and second spring sets are in series and the series arrangement and also optional relative weakness of the second spring set prevents a high rate, i.e., there is a relatively large compression of the first spring set as a result of applied torque. At $R_1$ spring set 3 enters in parallel with spring sets 1 and 2 thus permitting a higher torque capacity, i.e., up to 400 Newton-meters at a wind-up of about 12 degrees but due to the presence of the weaker set 1/set 2 series and optionally weaker spring set 2, wind up is still at a low rate of about 32 Newton-meters per degree of wind-up. At $R_2$ spring set 2 is bypassed, leaving spring sets 1 and 3 in series. The removal of relatively weak spring set 2 permits a greatly increased rate and prevents the springs of spring set 2 from bottoming out. With reference to the "coast side" of the curve, it should be noted that it operates in a similar way to the drive side of the curve except that wind-up is in reverse. In reverse, initially any energy stored in the damper from the drive side of the curve is released to output and then output flange 22, driven by the transmission, first partly compresses springs 16 in spring set 2 that in turn causes intermediate flange 18 to push springs 14 in spring set 1 against the cover plate attached either to the turbine or to the engine through piston plate 21. In a similar way to the drive side, springs 17 of spring set 3 are engaged and after sufficient wind up spring set 2 is bypassed either by lock up of intermediate flange 18 with the cover plate 12a/12b or by lockup of intermediate flange 18 with output flange 22. When spring sets 1 and 2 are of similar strength or when the intermediate flange locks to the output flange in a forward direction to prevent spring set 2 from bottoming out and the intermediate flange 18 locks to the cover plate 12a/12b in the reverse direction to prevent spring set 2 from bottoming out, the result is a coast side curve, similar in slope to the drive side curve.

FIGS. 6A-9B show the damper of the invention at various stages of wind-up with relative movement of the cover plate, intermediate flange and output flange and relative spring compressions.

Figure 6A:
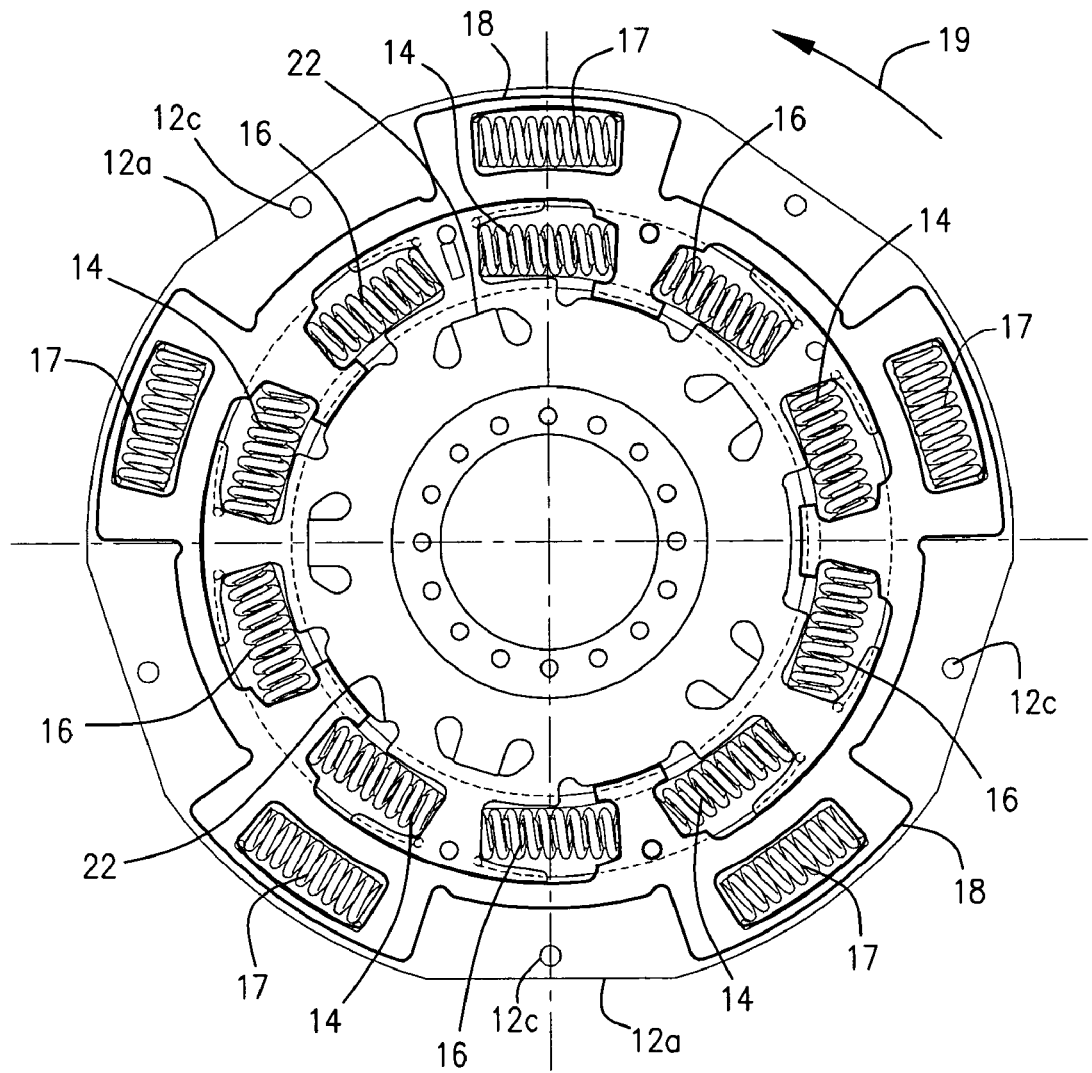
FIG. 6a is a view of the damper of FIG. 3 from the input side of the damper at zero wind-up angle, with the input side of the cover plate removed.
Figure 6B:
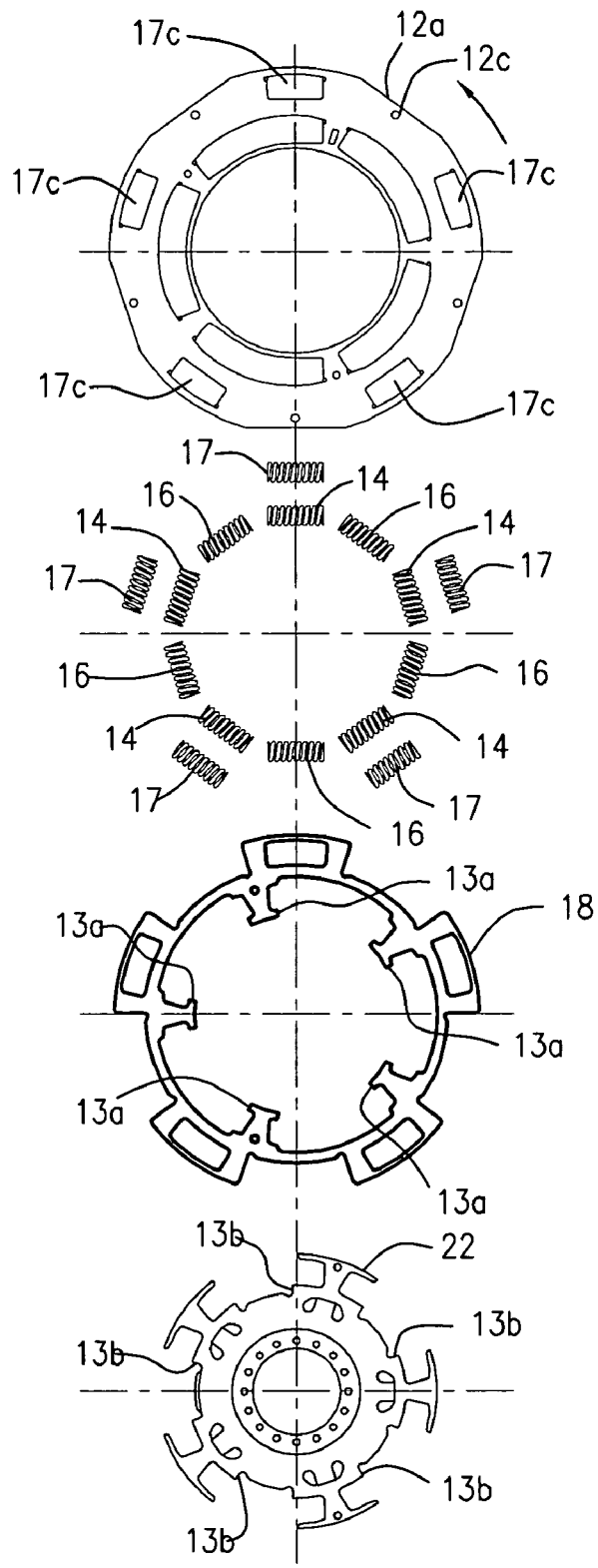
FIG. 6b is a planar parts assembly view of the damper of FIG. 6a at a zero wind up angle.

FIG. 6A shows a preferred embodiment of the assembled damper of the invention with damper parts in neutral position, i.e., no wind up in either forward or reverse directions. FIG. 6B shows the disassembled damper parts of FIG. 6A with relative orientations. The drive springs 14 and secondary springs 16 each occupy 26 degrees of the 360 degree arc of the damper and the parallel springs 17 each occupy 19 degrees of the 360 degree arc of the circumference of the damper.

Figure 7A:
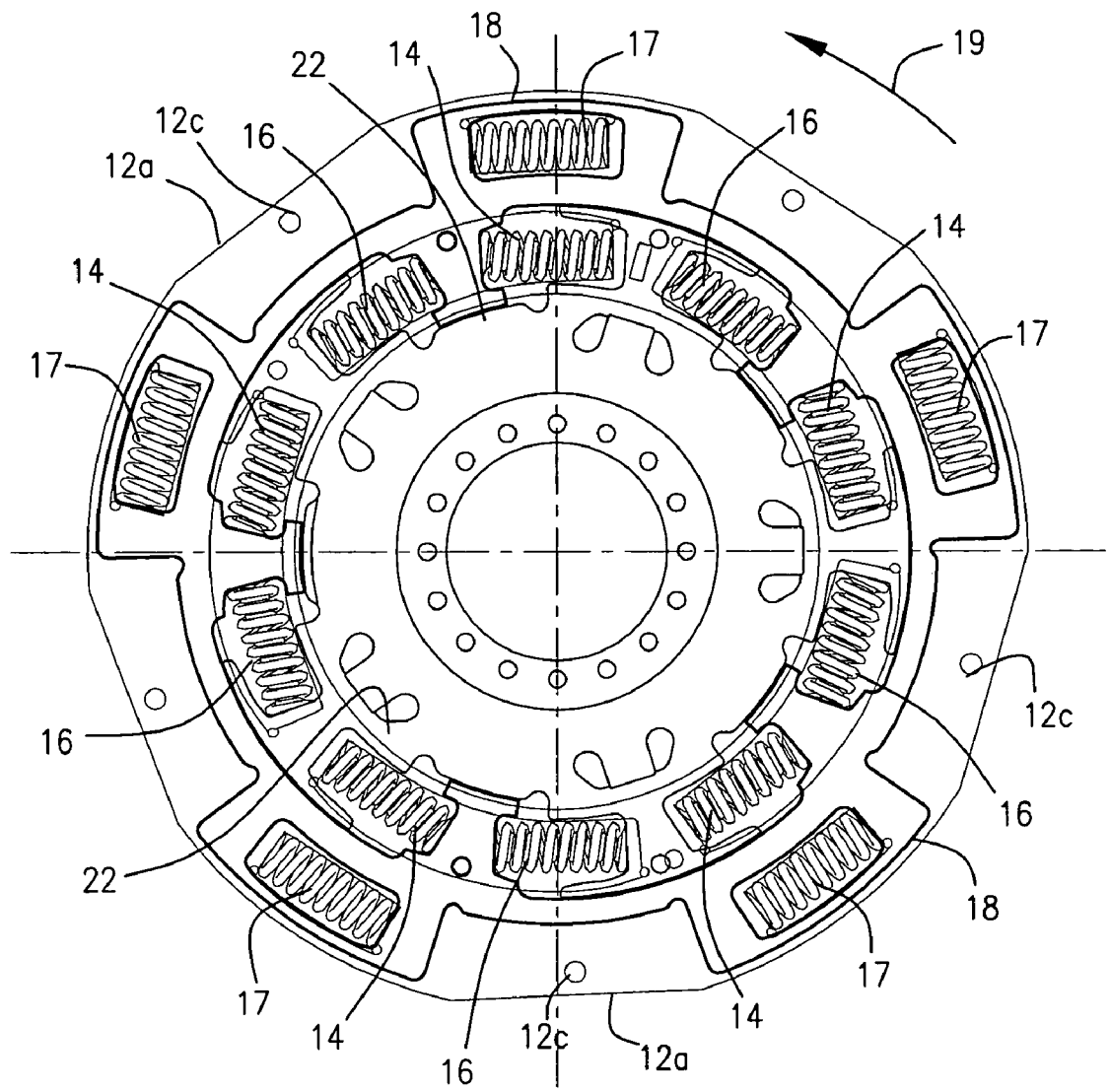
FIG. 7a is a view of the damper of FIG. 6a from the input side of the damper at a 2.4 degree wind-up angle.
Figure 7B:
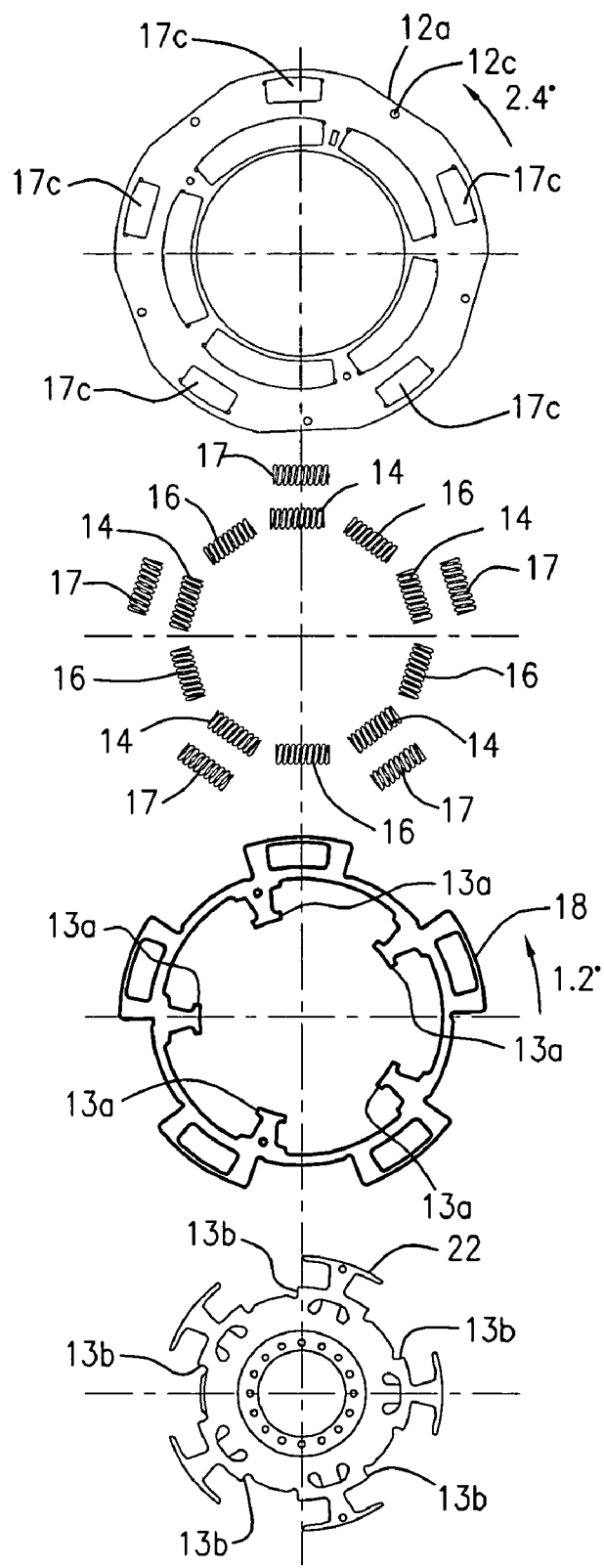
FIG. 7b is a planar parts assembly view at a 2.4 degree wind up angle.

FIG. 7A shows a preferred embodiment of the assembled damper of the invention with damper parts at about 2.4 degrees of forward wind up in the direction of arrow 19. FIG.

7B shows the disassembled damper parts of FIG. 7A with relative orientations and spring compressions. The cover plate has moved about 2.4 degrees, the intermediate flange has moved about 1.2 degrees and the output flange has not moved to show relative position of parts. The relative motion of the cover plate and intermediate flange is determined by torque variance between torque output from the engine and torque input to the transmission and relative strengths of spring set 1 and spring set 2.

Figure 8A:
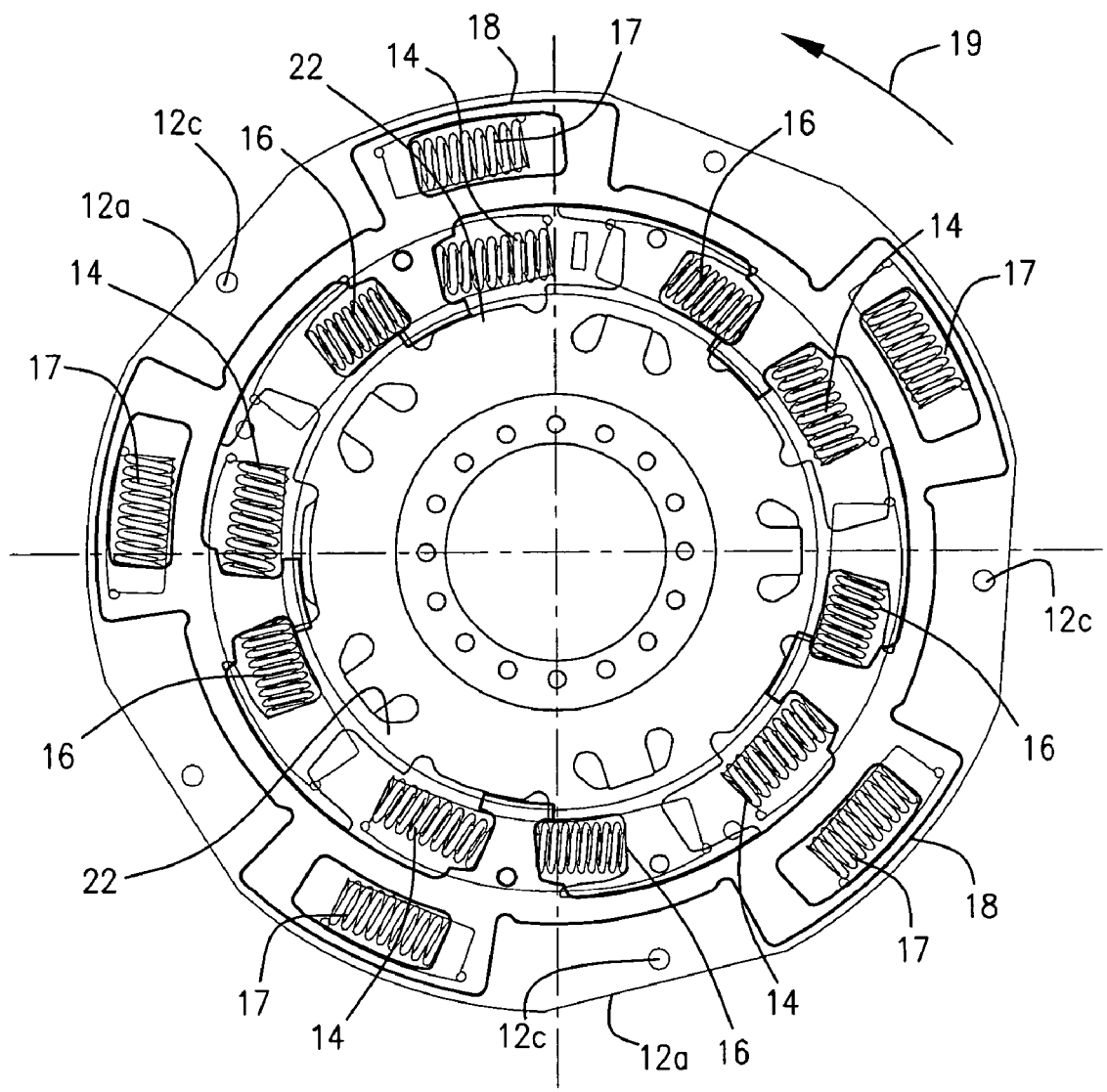
FIG. 8a is a view of the damper of FIG. 6a from the input side of the damper at 13.82 degree wind-up angle.
Figure 8B:
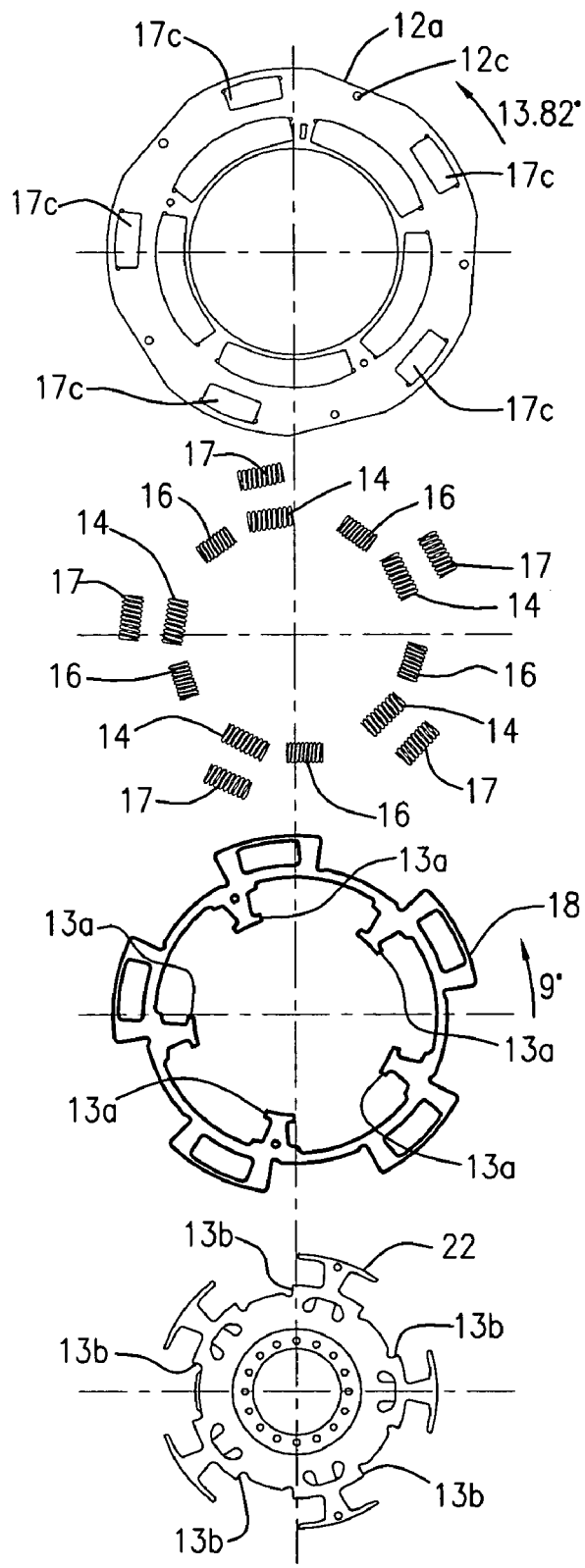
FIG. 8b is a planar parts assembly view at a 13.82 degree wind up angle.

FIG. 8A shows a preferred embodiment of the assembled damper of the invention with damper parts at 13.82 degrees of forward wind up. FIG. 8B shows the disassembled damper parts of FIG. 8A with relative orientations and spring compressions. The cover plate has moved about 13.82 degrees, the intermediate flange has moved about 9 degrees and the output flange has not moved to show relative position of parts. The relative motion of the cover plate and intermediate flange is determined by torque variance between torque output from the engine and torque input to the transmission and the relative strengths of spring sets 1, 2 and 3.

Figure 9A:
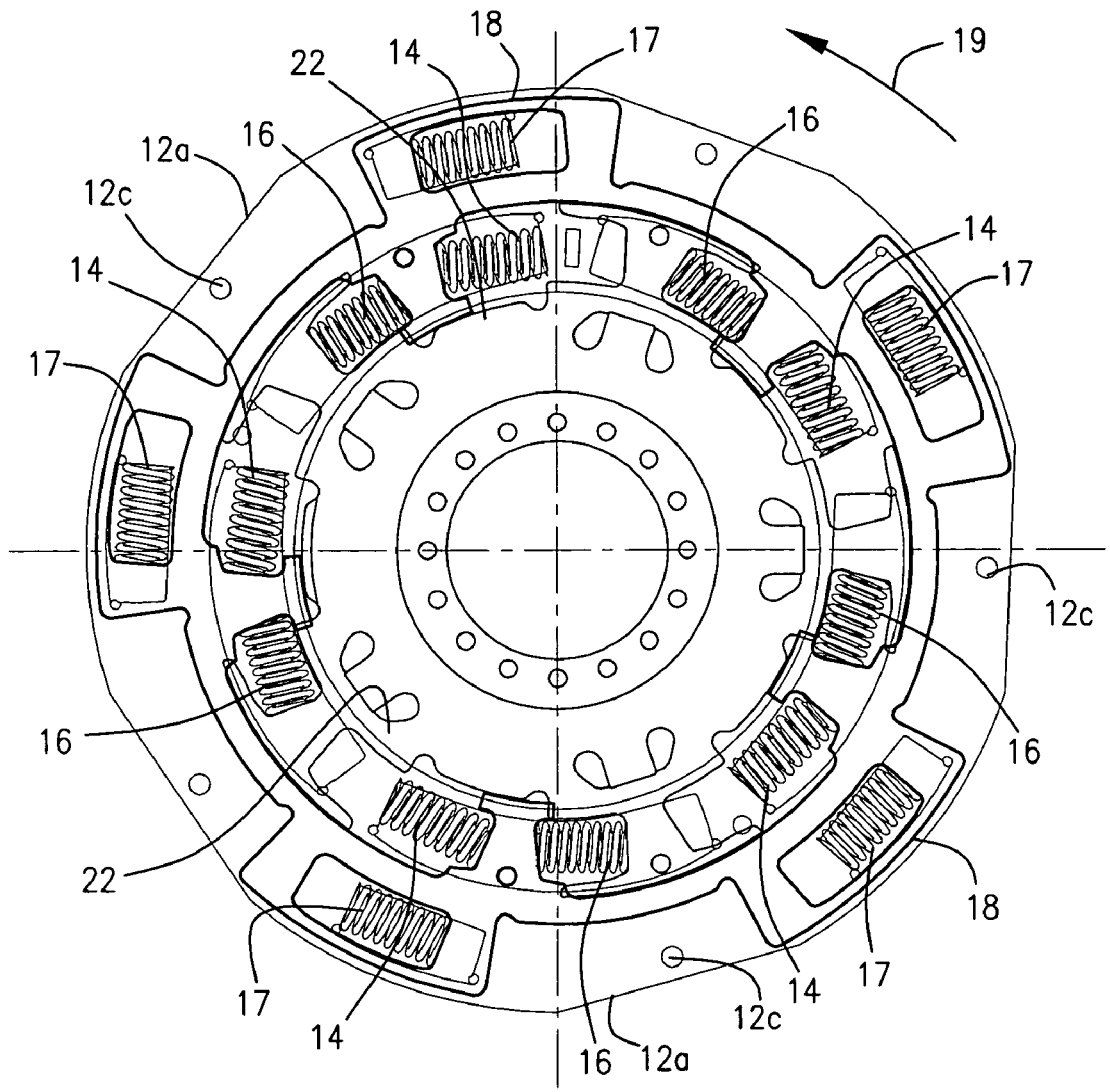
FIG. 9a is a view of the damper of FIG. 6a from the input side of the damper at 15.5 degree wind-up angle.
Figure 9B:
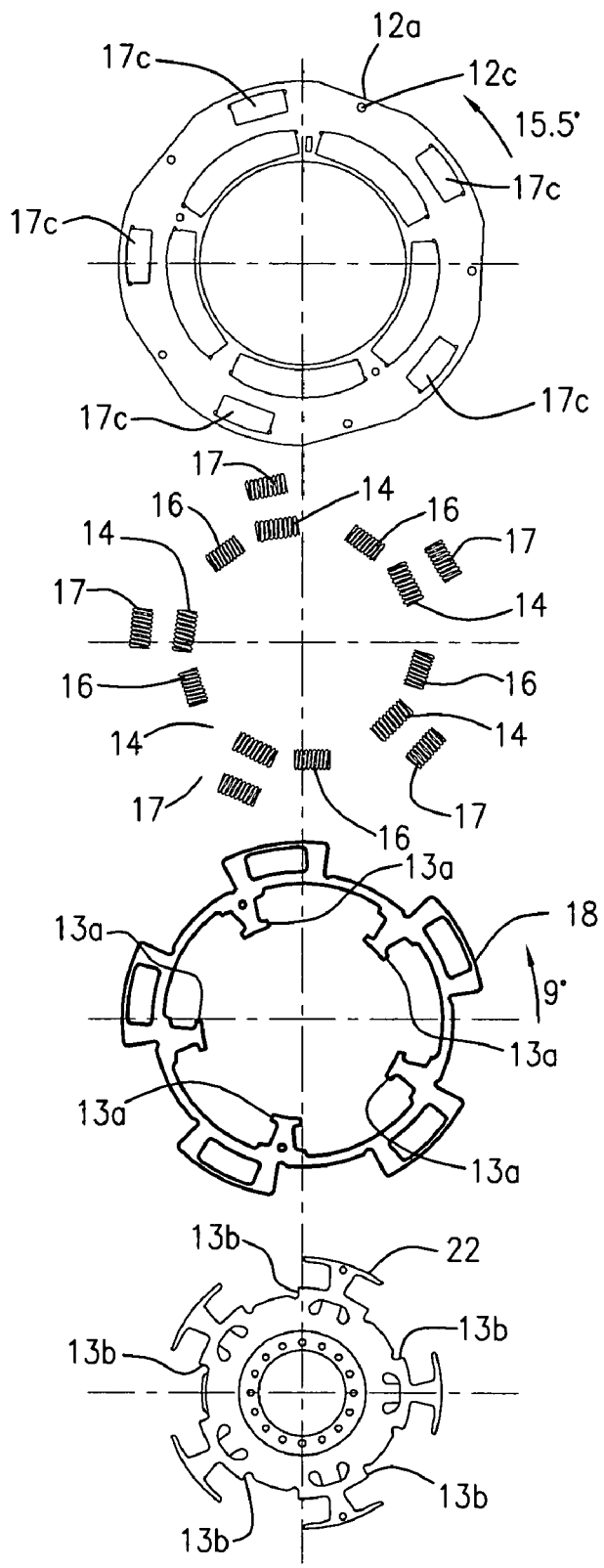
FIG. 9b is a planar parts assembly view at a 15.5 degree wind up angle.

FIG. 9A shows a preferred embodiment of the assembled damper of the invention with damper parts at 15.5 degrees of forward wind up. FIG. 9B shows the disassembled damper parts of FIG. 9A with relative orientations and spring compressions. The cover plate has moved about 15.5 degrees, the intermediate flange has moved about 9 degrees and the output flange has not moved to show relative position of parts. The relative motion of the cover plate and intermediate flange is determined by torque variance between torque output from the engine and torque input to the transmission and the strengths of spring sets 1 and 3.

It is to be understood that the invention also includes a method for damping torque output from a torque converter turbine to output to a transmission, as described above with respect to the apparatus. In particular the method includes the steps of:
 a) operating spring sets one and two in series between torque input and torque output to allow a large wind up relative to torque input (low "rate");
 b) placing a spring set three in parallel with spring sets one and two in series thus increasing torque capacity and allowing less wind-up relative to torque input than in step a) thus absorbing more torque per degree of wind-up (intermediate "rate"); and
 c) removing spring set two from series with spring set one (bypassed) thus relying upon the higher strength of spring set 2 alone in parallel with spring set 3 and preventing spring set 1 from bottoming out, resulting in even more torque per degree of wind-up (higher "rate) than in step b).

What is claimed is:

1. A torque converter damper comprising:
 a) an input device for connection to an engine;
 b) a first spring set having drive springs with drive spring first and second ends;
 c) a second spring set having secondary springs with secondary spring first and second ends;
 d) a third spring set having parallel springs with parallel spring first and second ends
 e) a floating apparatus free to move with an applied spring pressure p; and
 f) an output device;
 springs of said first spring set being compressible in a forward direction toward said output device as a result of torque applied to the input device and compressible in a reverse direction toward said input device as a result of torque applied by the output device; said first and second spring sets being in series between the input apparatus and output devices during a first forward compression of the first spring set; said first and second spring sets being in series between the input apparatus and output apparatus and said series being in parallel with said third spring set between the input apparatus and output apparatus during a second forward intermediate compression of said first spring set; and said first spring set being in parallel with said third spring set between the input apparatus and output apparatus during a third forward compression of the first spring set, said floating apparatus being between said input apparatus and said output apparatus and interposed at least between springs of said first and second spring sets during the first forward compression of said first spring set so as to pass a portion of torque applied by said input apparatus to said first spring set, to said second spring set that in turn passes a portion of said applied torque to said output apparatus.

2. The torque converter damper of claim 1 where drive spring first ends are connected to the input device and drive spring second ends are connected to the floating apparatus.

3. The torque converter damper of claim 2 wherein the first forward compression is a compression of between 0 and 90 percent compression of springs of spring set one and a locking device is provided to lock the floating apparatus to the output device at the second forward compression of between 40 and 90 percent compression of springs of spring set one.

4. The torque converter damper of claim 3 where the locking device includes interacting output device and floating apparatus contact surfaces.

5. The torque converter damper of claim 2 wherein first ends of springs of spring set two are in contact with the floating apparatus and second ends of springs of spring set two are in contact with the output device.

6. The torque converter damper of claim 1 where springs of the third spring set are located between the input device and the floating apparatus such that first and second ends of springs of the third set of springs engage the input device and floating apparatus respectively, at a position between 2 and 30 percent compression of spring set one.

7. A torque converter damper having an input device for receiving torque energy from an input apparatus and an output device for passing torque energy to an output apparatus, said input device being connected to first ends of springs of a first spring set (first spring set first ends) and second ends of springs of first spring set (first spring set second ends) being in contact with first contact surfaces of a floating apparatus and a second contact surface of the floating apparatus being in contact with first ends of springs of a second spring set (second spring set first ends) and second ends of the second spring set (second spring set second ends) being in contact with the output device such that the first and second spring sets are in series between the input apparatus and output device during a first forward compression of the first spring set; said floating apparatus being free to move in a first forward rotational direction with applied spring pressure to a first position between 0 and 99 percent compression of the first spring set and being locked to one of the input device and output device by a locking device at a second position between 40 and 99 percent compression of the first spring set; said floating apparatus also being free to move in a second reverse rotational direction opposite the first rotational direction with reverse applied spring pressure to a first position between 0 and 99 percent compression of the first spring set and may be locked to one of the input device and output device by a locking device at a second position between 40 and 99 percent compression of the first spring set; a third spring set being located between the input device and intermediate flange or directly between the input device and output device such that first ends of the third spring set engage the input device and transfer torque, at second ends of the springs of the third spring set, to the output device, directly or through the intermediate flange, at a position between 5 and 30 percent compression of the first spring set.

8. The damper of claim 7 where the secondary springs are weaker than the drive springs to initially permit a lower torque per degree of wind up of the damper.

9. A damper for a torque converter, where the torque converter has:
- a pump rotationally drivable by an engine; and
- a turbine provided with a central hub rotationally hydraulically drivable by the pump,
- an output hub for connection to an input shaft of a transmission,
- a cover plate radially oriented about and connected with and driven by the turbine hub and concentric with but rotationally free of the output hub;
- an intermediate flange radially oriented with respect to the output hub; said output hub forming a part of an output flange;
- a first set of drive springs each having first and second ends;
- a second set of secondary springs each having first and second ends; and
- a third set of parallel springs each having first and second ends,
- all of said springs being radially oriented with respect to the output hub and retained by the cover plate, said damper operating to transfer torque from the turbine of the torque converter to the output hub for connection to an input shaft of a transmission, such that, upon initial movement of the turbine and attached cover plate, the first end of each of said drive springs is in contact with the cover plate and the second end of each of the drive springs is in contact with the intermediate flange and the first end of each of the secondary springs is in contact with the intermediate flange and the second end of each of the secondary springs is in contact with the output flange such that upon application of torque by the turbine to the cover plate and from the cover plate to the drive springs, the drive springs compress and transfer force to and cause the intermediate flange to rotate and to thus compress the secondary springs causing the output flange and output hub to rotate, said drive and secondary springs absorbing energy from the turbine to compensate for time delay in overcoming initial inertia of the output hub and attached apparatus; said parallel springs being held in spaces within the cover plate and being initially free to slide in spaces in the intermediate flange such that upon initial rotation of the turbine, the parallel springs do not transfer torque from the cover plate to the intermediate flange but upon sufficient compression of the secondary and drive springs, the cover plate moves sufficiently far relative to the intermediate flange that the parallel springs contact both the cover plate and the intermediate flange so the parallel springs transfer torque from the cover plate to the intermediate flange in parallel with the drive springs in series with the secondary springs further increasing torque capacity transferred to the intermediate flange and thus to the output flange as torque increases, said intermediate flange and output flange being provided with stop faces such that the intermediate flange and output flange contact each other to directly transfer rotational energy from the intermediate flange to the output flange removing the secondary springs from series with the drive springs thus permitting the drive springs and parallel springs to transfer higher torque to the intermediate flange and the intermediate flange to transfer more torque to the output flange than capable by the secondary springs.

10. The damper for a torque converter of claim 9 where the secondary springs are weaker than the drive springs.

11. A method for damping torque output from a torque converter turbine to output to a transmission comprising the steps of:
a) operating a spring set one and a spring set two in series between torque input and torque output to allow a large wind up relative to torque input;
b) placing a spring set three in parallel with spring sets one and two in series thus increasing torque capacity and allowing less wind-up relative to torque input than in step a) thus absorbing more torque per degree of wind-up; and
c) removing spring set two from series with spring set one thus employing higher compressive strength of spring set two alone in parallel with spring set three resulting in even more torque per degree of wind-up than in step b).

* * * * *